(12) United States Patent
Wilson

(10) Patent No.: US 7,961,003 B2
(45) Date of Patent: *Jun. 14, 2011

(54) MULTI-DROP BUS SYSTEM

(75) Inventor: John Wilson, Raleigh, NC (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/847,910

(22) Filed: Jul. 30, 2010

(65) Prior Publication Data

US 2011/0025374 A1    Feb. 3, 2011

Related U.S. Application Data

(63) Continuation of application No. 12/012,511, filed on Jan. 31, 2008, now Pat. No. 7,768,297.

(60) Provisional application No. 60/898,659, filed on Jan. 31, 2007.

(51) Int. Cl.
*H03K 17/16* (2006.01)

(52) U.S. Cl. .......................................... 326/30; 333/124
(58) Field of Classification Search ................... 326/21, 326/26, 27, 30, 82, 83; 333/22 R, 124, 246
See application file for complete search history.

(56) References Cited

U.S. PATENT DOCUMENTS

| 6,067,594 A * | 5/2000 | Perino et al. ................... 710/301 |
| 2003/0065877 A1 * | 4/2003 | Gillingham et al. .......... 711/104 |

* cited by examiner

*Primary Examiner* — Don P Le
(74) *Attorney, Agent, or Firm* — Morgan, Lewis & Bockius LLP

(57) ABSTRACT

A multi-drop bus system and a method for operating such a system. The system includes a multi-drop bus having at least one bus line, each bus line being made up of a multiple of line segments. Each of the line segments terminates at a drop point and each drop point is coupled to a load impedance. The characteristic impedance of a line segment is matched to the equivalent impedance presented by the load impedance in combination with the characteristic impedance of a following segment, or is matched to the load impedance if there is no following segment.

20 Claims, 8 Drawing Sheets

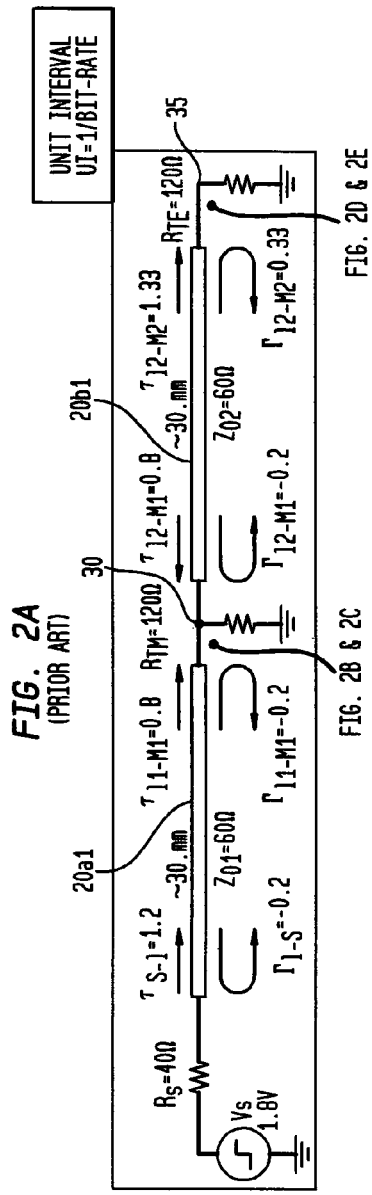
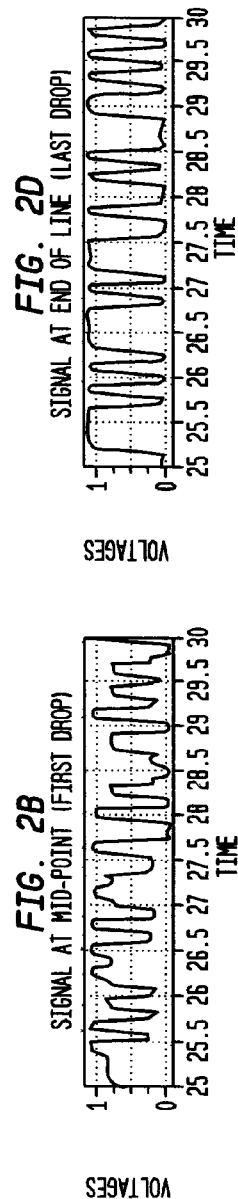

SIGNAL AT MID-POINT (FIRST DROP)

SIGNAL AT MID-POINT (FIRST DROP)

SIGNAL AT END OF LINE (LAST DROP)

SIGNAL AT END OF LINE (LAST DROP)

STRIP LINE

MICRO-STRIP LINE

LINE WIDTH: STRIP VS. MICRO-STRIP LINE

DOUBLE PUMP, SINGLE EDGE, n/2 LINES

QUAD PUMP, DOUBLE EDGE, n/4 LINES 

MULTI-DROP BUS SYSTEM

RELATED APPLICATION

This application is a continuation of U.S. application Ser. No. 12/012,511, filed Jan. 31, 2008, now U.S. Pat. No. 7,768, 297 entitled "Multi-Drop Bus System," which claims priority of U.S. Provisional Application Ser. No. 60/898,659, filed Jan. 31, 2007, which are incorporated herein by reference in their entirety.

BACKGROUND

Modern digital systems typically include an address bus and a data bus for communicating digital values. In a common application, a memory controller is linked to multiple memory modules through a multi-drop address bus and a multi-drop data bus. Signals on the address bus denote the memory location being accessed by the controller. The signals on the data bus serve to transfer data to/from the addressed memory locations. FIG. 1 shows such a system.

The FIG. 1 system includes a memory controller 5, a first memory module 10, and a second memory module 15. The controller and memory modules are coupled together by a multi-drop address bus 20 and a multi-drop data bus 25. The address bus is made up of "N" address signal lines, and the data bus is made up of "M" data signal lines. Each of the buses is made up of two segments. The address bus is made up of segments 20a and 20b, and the data bus is made up of segments 25a and 25b. Segment 20a includes individual address bus line segments 20a1-20aN, and segment 20b includes individual address bus line segments 20b1-20bN. Similarly, segment 25a includes individual data bus line segments 25a1-25aM, and segment 25b includes individual data bus line segments 25b1-25bM. It is noted that "N" and "M" are integers greater than or equal to 1, and that "N" and "M" may be the same integer (e.g. 32) or different integers.

In order to maximize the rate at which the system of FIG. 1 operates, the rate at which digital signals are transmitted over the address and data lines must be maximized. That is, the maximum rate of system operation is dependant on the rate at which digital symbols appearing on the address and data lines can be distinguished from temporally adjacent symbols appearing on the same line. If one assumes an unlimited rate of sampling for signals appearing on the address and data lines, and perfectly synchronized sampling, then the limiting factor in distinguishing the symbols appearing on the lines is the rate at which digital states of the signals appearing on the lines can be unambiguously determined from one digital state to another. Accordingly, the maximum rate of system operation is dependant upon how fast the digital states of the address and data signals can be unambiguously determined in a binary system, the rate of system operation is dependant upon how fast the binary states of the address and data signals can be unambiguously determined.

BRIEF DESCRIPTIONS OF THE DRAWINGS

The following detailed description given by way of example, but not intended to limit the invention solely to the specific embodiments described, may best be understood in conjunction with the accompanying drawings wherein like reference numerals denote like elements and parts, in which:

FIG. 2A is a circuit model of a multi-drop bus line system.

FIGS. 2B-2E are graphs depicting how a signal transmitted over the bus line of FIG. 2A appears at the mid-point and end-point drops of the bus line.

DETAILED DESCRIPTION

It has been recognized that the presence of impedance mismatches in multi-drop bus systems causes reflections on the bus lines which, in turn, decreases the rate at which the states of signals transmitted over the bus lines can be unambiguously determined. To overcome the drawbacks associated with prior multi-drop bus systems a multi-drop bus system in which impedance mismatches are absent or minimized has been developed. In addition, various applications for such an "impedance matched" multi-drop bus system have been developed. Various embodiments, of the "impedance matched" multi-drop bus system and its applications are described in detail in this specification.

Figure 1:
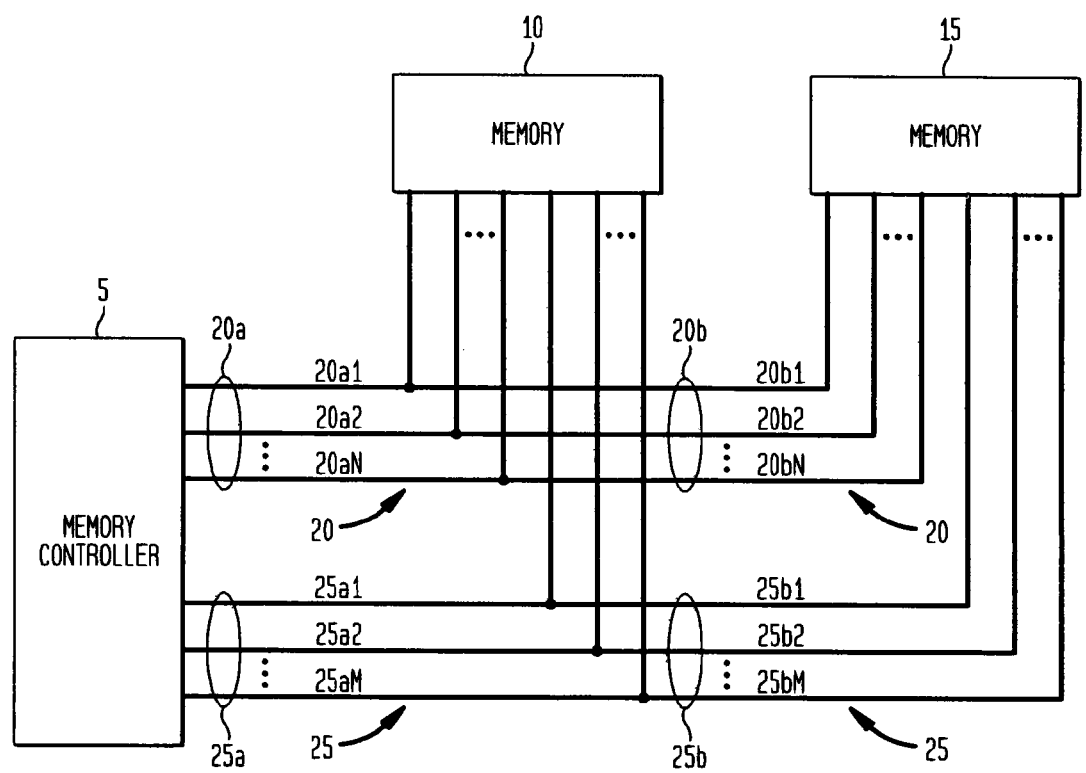
FIG. 1 is a block diagram of a memory system employing a multi-drop address bus and a multi-drop data bus.

For the sake of brevity, some embodiments are described in the context of a memory system that includes a memory controller and a multiple of memory modules. One such system is depicted in FIG. 1. However, upon studying the present disclosure, one skilled in the art will readily appreciate how the described embodiments may be implemented in contexts other than the illustrative memory system.

Referring now to FIG. 2A, there is shown a circuit model of a multi-drop bus line system in accordance with the prior art. The line depicted in FIG. 2A corresponds to the line defined by segments 20a1 and 20b1 of FIG. 1. Nevertheless, the principles discussed in connection with FIG. 2A are equally applicable to any of the bus lines depicted in FIG. 1. FIG. 2A is used in conjunction with FIGS. 2B to 2E to show the ill effects of impedance mismatch.

As can be seen from FIG. 2A, the characteristic impedance of each of line segments 20a1 and 20b1 is 60 ohms. The input impedance of the first memory module (memory module 10 of FIG. 1), for a signal propagating from line segment 20a1 to the first memory module, is 120 ohms. The input impedance of the second memory module (memory module 15 of FIG. 1), for a signal propagating from line segment 20b1 to the second memory module, is 120 ohms. The first memory module is coupled to the line at a mid-point drop 30, and the second memory module is coupled to the line at an end-point drop 35. The load impedance coupled to the mid-point drop is 120 ohms, and the load impedance coupled to the end-point drop is 120 ohms. The characteristic impedance of the first line segment is denoted by "Zo1", and the characteristic impedance of the second line segment is denoted by "Zo2". The load impedance at the mid-point drop is denoted by "$R_{TM}$", and the load impedance at the end-point drop is denoted by "$R_{TE}$".

FIG. 2A shows that line segments 20a1 and 20b1 are driven by a voltage source acting through a source impedance. Thus, the portion of the memory controller (memory controller 5 of FIG. 1) that drives line segments 20a1 and 20b1 is modeled as the voltage source acting through the source impedance. More specifically, the line segments are driven by a voltage source "Vs" which generates 1.8v signals through a source impedance "Rs" of 40 ohms. In other embodiments, the memory controller or other device which drives line segments 20a1 and 20b1, may be a current source. Nevertheless, for purposes of brevity of this description the driver will be assumed to be a voltage source. Upon studying this description, one skilled in the art will readily appreciate how a current source can act as the driver.

The circuit of FIG. 2A is not an impedance-matched circuit. Indeed, at no point in the circuit of FIG. 2A is any "feeding" element, either source or line segment, matched to the equivalent load it drives. For example, a signal propagating on line segment 20a1 toward the mid-point drop encounters an equivalent impedance of 40 ohms ($R_{TM}$ in parallel with Zo2; 120 ohms in parallel with 60 ohms), while the line feeding it is 60 ohms. Further, the impedance of the end-point drop is 120 ohms while the characteristic impedance of the line feeding it is 60 ohms. Such mismatches give rise to reflections which corrupt signals generated by source Vs, such that when the generated signals arrive at the mid-point and end-point drops, their transitions are noisy and therefore more difficult to detect.

Secondary reflections also contribute to the corruption of signals transmitted from the signal source. For example, a reflected signal caused by reflection of a signal propagating down line segment 20a1 toward the mid-point drop will be secondarily reflected at the junction between the line segment 20a1 and the source. Such secondary reflection is caused by the impedance mismatch between the characteristic impedance of line segment 20a1 and the source resistance.

The primary and secondary reflections in the circuit of FIG. 2A are indicated by curved arrows. Each of the reflections is associated with a reflection coefficient. Similarly, at each reflection point, a straight arrow indicates the portion of the signal that is transmitted. Each of the transmitted portions is associated with a transmission coefficient. The symbol "$\Gamma$" is used to indicate reflection coefficients, and the symbol "$\tau$" is used to denote transmission coefficients. When a signal is propagating from an impedance of "$Z_o$" to an impedance of "$Z_x$" the reflection coefficient associated with the interface between "$Z_o$" and "$Z_x$" is denoted by "$\Gamma_{o-x}$", and the coefficient is the given by the equation $\Gamma_{o-x}=(Z_x-Z_o)/(Z_x+Z_o)$. The transmission coefficient for the signal propagating from impedance "$Z_o$" to impedance "$Z_x$" is denoted by "$\tau_{o-x}$", and the coefficient is the given by the equation $\tau_{o-x}=1+\Gamma_{o-x}$. Thus, for example a signal propagating on line segment 20a1 (denoted by "l1") toward the mid-point drop (denoted by "M1") is moving from a "$Z_o$" of 60 ohms (characteristic impedance of line segment 20a1 to a "$Z_x$" of 40 ohms (equivalent impedance at mid-point drop), and therefore the reflection coefficient at the interface of segment 20a1 and the midpoint drop is $\Gamma_{l1-M1}=(40-60)/(40+60)=-0.2$.

In any event, the effect of the reflections on signals generated by the signal source is shown in FIGS. 2B-2E. FIGS. 2B-2E are graphs depicting how a signal generated by source Vs of FIG. 2A, and transmitted over line segments 20a1 and 20b1 of FIG. 2A, appears at the mid-point and end-point drops of the signal line. The transmitted signal in the illustrated case is an 8 Gbps digital binary signal that transitions between 0V and approximately 1.1V, and the transmitted bit pattern represented by the signal is a random bit pattern. FIG. 2B shows how the transmitted signal appears at the mid-point drop. As can be seen from FIG. 2B, the peaks and valleys of the signal are inconsistent, and the transitions between peaks and valleys are not precisely defined.

FIG. 2C depicts the signal eye diagram at the mid-point drop. As can be seen from FIG. 2C, the signal eye diagram is somewhat closed indicating that the voltage and timing margins of the system are relatively narrow. Indeed, the times at which the transitions cross the 500 mV level vary widely, and the high and low signal values also vary widely. More specifically, the transition times vary within a range of about +/−25 ps, which is about +/−20% of a bit interval for an 8 Gbps signal (period=125 ps). The high signal value varies within a range of about 1.1V to 800 mV and the low signal value varies within a range of about 0 mV to about 300 mV, each varying by about 33% of the 0V to 1.1V (approximate) range of the transmitted signal.

The signal appearing at the end-point drop is significantly better than the signal appearing at the mid-point drop. FIG. 2D shows how the transmitted signal appears at the end-point drop. As can be seen by comparing FIG. 2D to FIG. 2B, the peaks, valleys, and transitions of the signal are better at the end-point drop than they are at the mid-point drop. Nevertheless, the signal at the end point drop is corrupted by the impedance mismatches present in the circuit.

FIG. 2E depicts the signal eye diagram at the end-point drop. As can be seen by comparing FIG. 2E to FIG. 2C, the signal eye at the end-point drop is better defined (i.e., more open) than the signal eye at the mid-point drop. Nevertheless, the signal eye at the end-point drop is corrupted by the impedance mismatches, as evidenced by the thickness of the plot-lines depicting the signal eye.

Figure 3A:
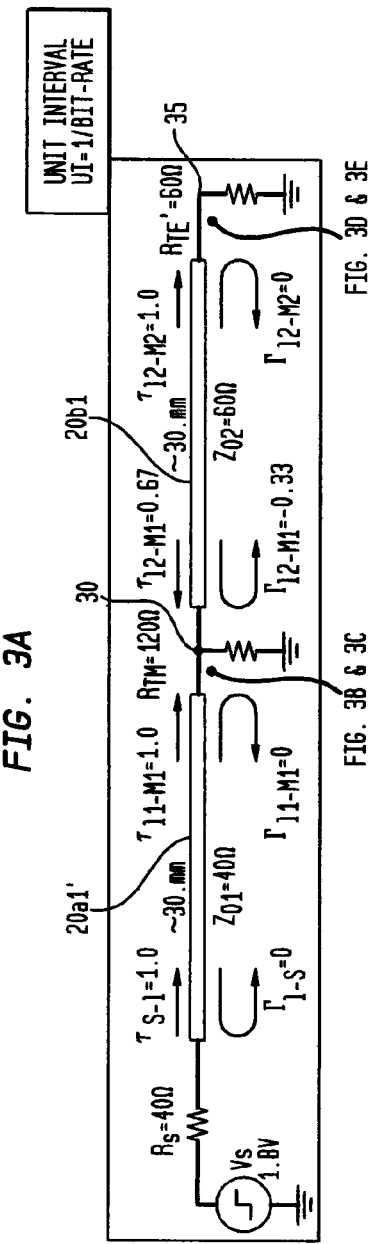
FIG. 3A is a circuit model of a multi-drop bus line system according to one embodiment.
Figure 3B:
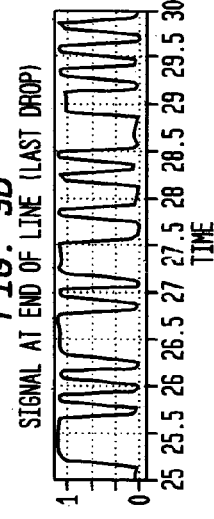
FIGS. 3B-3E are graphs depicting how a signal transmitted over the bus line of FIG. 3A appears at the mid-point and end-point drops of the bus line.
Figure 3C:
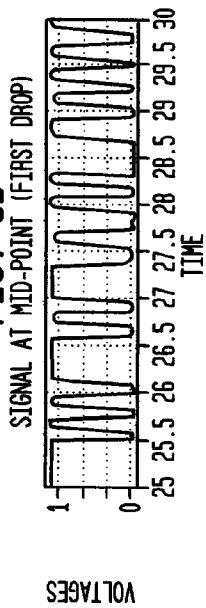
Figure 3D:
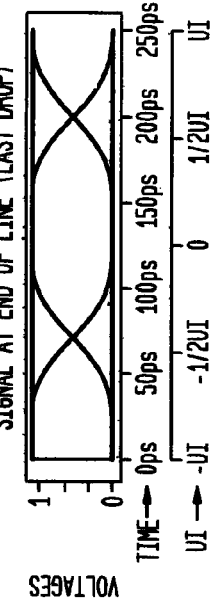
Figure 3E:
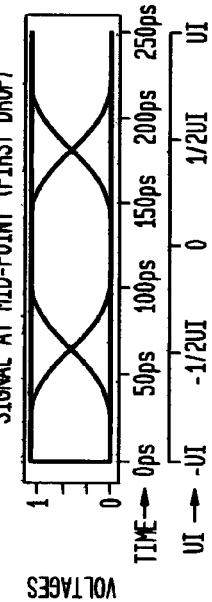

FIG. 3A is a circuit model of a multi-drop bus line system according to one embodiment. The multi-drop bus line system of FIG. 3A is impedance-matched for signals traveling from source Vs to end-point load $R_{TE}'$. In particular, the load impedance at the end-point drop is set to 60 ohms, which matches the characteristic impedance of line segment 20b1. Also, the system includes a first line segment 20a1' having a characteristic impedance of 40 ohms so as to match the equivalent load impedance at the mid-point drop. More specifically, a signal propagating from line segment 20a1' to the mid-point drop encounters an equivalent impedance of 40 ohms (120 ohms in parallel with 60 ohms) at the mid-point drop, which matches the impedance of segment 20a1'. Further, by setting the characteristic impedance of the first line segment to 40 ohms, the impedance of the first segment is matched to the source impedance. Thus, a system having matched impedance in the direction of source to end-point drop can be realized by modifying the system of 2A to change the load impedance at the end-point drop and the characteristic impedance of the first line segment.

It should be noted that in other embodiments, a multi-drop bus line system is configured to be nearly impedance-matched in both directions. That is, in other embodiments each bus line and its corresponding loads are configured so as to be nearly impedance-matched both for signals propagating in the direction of the source Vs to the end-point drop and for signals propagating in the direction of the end-point drop to the source. In some embodiments of a nearly matched system, the most important sections for matching are at each end of a cascade of line segments, where matching may be easily done. The matching of the internal drop point(s) is also important. In some embodiments however, the matching of internal drop point(s) may not be possible for signals traveling in both directions. Therefore, in some embodiments, a compromise from perfect matching at internal drop points, that attains the best overall system performance, may need to be made for bi-directional operation. In this manner, the advantages of impedance-matching may be realized for signals transmitted in either direction.

FIGS. 3B-3E are graphs depicting how a signal generated by source Vs of FIG. 3A and transmitted over line segments $20a1'$ and $20b1$ of FIG. 3A appears at the mid-point and end-point drops of the bus line. The transmitted signal in the illustrated case is the same transmitted signal as that discussed in connection with FIGS. 2A-2E, an 8 Gbps digital binary signal that transitions between 0V and approximately 1.1V. The bit pattern transmitted is also the same as that transmitted in FIGS. 2A-2E. Accordingly, FIGS. 3B-3E can be compared to FIGS. 2B-2E without having to account for differences in the transmitted signal.

It should be noted that the transmitted signal referred to in connection with FIGS. 2B-2E and 3B-3E is merely illustrative. That is, the embodiments are not limited to operation with an 8 Gbps digital binary signal that transitions between 0V and approximately 1.1V. The embodiments are operable with a wide variety of signal types, and upon review of this description the skilled artisan will readily appreciate how the embodiments are implemented with various signals types.

As can be seen by comparing FIGS. 3B and 3C to FIGS. 2B and 2C, the signal appearing at the mid-point drop of the FIG. 3A circuit is uncorrupted relative to the signal appearing at the mid-point drop of the FIG. 2A circuit. Similarly, by comparing FIGS. 3D and 3E to FIGS. 2D and 2E it can be seen that the signal appearing at the end-point drop of the FIG. 3A circuit is uncorrupted relative to the signal appearing at the end-point drop of the FIG. 2A circuit. Thus, the transitions of digital signals transmitted from the source to either drop in the FIG. 3A circuit can be distinguished at the drops at a faster rate than such transitions can be distinguished at the drops of the FIG. 2A circuit. Therefore, the circuit of FIG. 3A can be operated at a faster rate than the circuit of FIG. 2A.

The advantages of the FIG. 3A configuration can be realized for a bus rather than for a single bus line simply by applying the impedance matching demonstrated in FIG. 3A to each line of the bus. For instance, in the context of FIG. 1, the address bus can be impedance-matched by applying the principles of FIG. 3A to each of the N address bus lines on a line-by-line basis. Thereby, increasing the rate at which addresses can be transmitted over the bus. Or, in other words, decreasing the amount of time in which a given number of N-bit addresses can be transmitted over the bus.

Figure 3F:
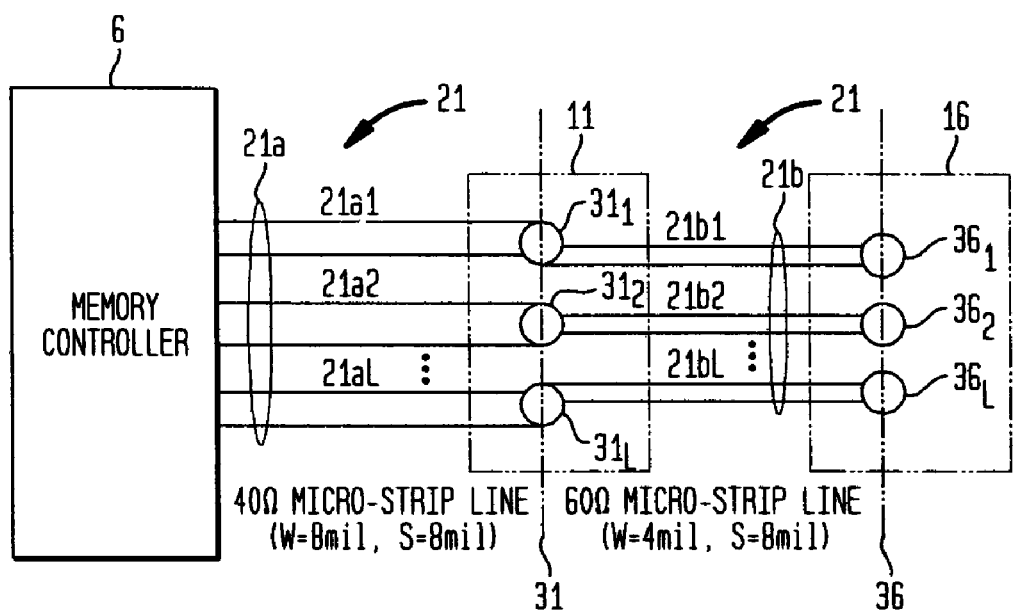
FIG. 3F is a block diagram showing an illustrative embodiment that implements the impedance matching principles discussed in connection with FIG. 3A.

FIG. 3F is a block diagram showing an illustrative embodiment that implements the impedance matching principles discussed in connection with FIG. 3A. FIG. 3F shows a memory system that includes a memory controller 6, a first memory module 11 (shown in phantom), and a second memory module 16 (shown in phantom). The controller and memory modules are coupled together by a multi-drop bus 21. The multi-drop bus is made up of "L" signal lines, "L" being an integer greater than or equal to 1. The bus includes two segments 21a and 21b, segment 21a including individual bus line segments $21a1$-$21aL$, and segment 21b including individual bus line segments $21b1$-$21bL$. Each of line segments $21a1$-$21aL$ and $21b1$-$21bL$ is a micro-strip-line transmission line. In some embodiments, one or more of micro-strip-line transmission lines $21a1$-$21aL$ and $21b1$-$21bL$, may be implemented as a shielded micro-strip-line transmission line. For example, in some embodiments, a pad or line comprised of a metal or another electrically conductive material may be disposed along side of or adjacent to one of the line segments $21a1$-$21aL$ or $21b1$-$21bL$. Such pad or line is electrically coupled to a reference plane, such as, for example, the bottom conductor 60 depicted in FIG. 4B. The pad or line is also typically electrically isolated from the corresponding line segment $21a1$-$21aL$ or $21b1$-$21bL$. In some embodiments a pad or line may be disposed between two line segments, such as between line segment $21a1$ and line segment $21a2$ to shield both line segments.

The bus includes two drops, a mid-point drop 31 and an end-point drop 36. The mid-point drop is made up of "L" points $31_1$-$31_L$, and the end-point drop is made up of "L" points $36_1$-$36_L$. Through points $31_1$-$31_L$ memory module 11 is coupled to respective signal lines, and through points $36_1$-$36_L$ memory module 16 is coupled to respective signal lines. Points $31_1$-$31_L$ are respectively coupled to the memory controller by line segments $21a1$-$21aL$, and are respectively coupled to points $36_1$-$36_L$ by line segments $21b1$-$21bL$.

The memory system of FIG. 3F is impedance-matched. That is, the characteristic impedance of the line segments, the source impedance of the memory controller, the input impedance the first memory module, and the input impedance of the second memory module are selected such that each signal line exhibits the impedance-matched properties discussed in reference to FIG. 3A. More particularly, the system is designed such that line segments $21a1$-$21aL$ each have a characteristic impedance of 40 ohms, line segments $21b1$-$21bL$ each have a characteristic impedance of 60 ohms, the memory controller has a source impedance of 40 ohms, the first memory module has an input impedance of 120 ohms, and the second memory module has an input impedance of 60 ohms. In this manner, the system has properties like those described in connection with FIG. 3A.

Several items should be noted with respect to FIG. 3F. For one, it should be noted that the system of FIG. 3F includes only one bus. In such a system, address information, data, and control information may be carried on the bus. However, the embodiments are not limited to single bus systems. For example, a multi-bus embodiment may include a data bus and an address bus, either bus or both buses employing impedance-matching principles. Alternatively, a multi-bus embodiment may include a data bus, an address bus, and a control bus, with one or more of the buses employing impedance-matching principles. Further, in multi-bus embodiments each bus is not limited to carrying one type of signal (e.g. address signal), but rather, may carry two or more types of signals (e.g. address and control signals). Further, it should be noted that the embodiments are not limited to unidirectional binary signaling. The signal lines may be bidirectional. Also, embodiments include those in which one or more buses implement single-ended signaling, differential signaling, or multi-wire signaling (where "X" wires are used to transmit more than "X" bits during a single bit period). Moreover, embodiments include those in which one or more buses implement multi-level signaling (where each wire, or group of wires, is used to transmit more than one bit of information during a single bit time).

Having provided an overall description of an impedance-matched multi-drop bus of one embodiment, a more detailed description of such a bus will now be provided.

Figure 4A:
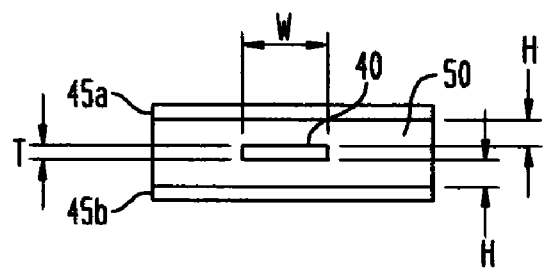
FIG. 4A is a cross-sectional view of a strip-line transmission line.
Figure 4B:
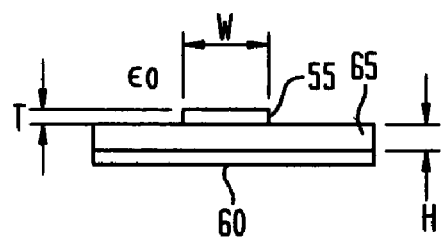
FIG. 4B is a cross-sectional view of a micro-strip-line transmission line.

An impedance-matched multi-drop bus according to one embodiment is formed using strip-line and/or micro-strip-line segments. FIG. 4A is a cross-sectional view of a strip-line transmission line, and FIG. 4B is a cross-sectional view of a micro-strip-line transmission line. As can be seen from FIG. 4A, a strip-line transmission line is made up of a center conductor 40, two outer conductors (or "reference planes") 45a and 45b, and a dielectric material 50. The center conductor has a width "W" and a thickness "T". The center conductor does not have to be equidistant from the two outer conductors. Nevertheless, in the example depicted in FIG. 4A, the center conductor is equidistant from the two outer conductors, the distance from either outer conductor to the center conductor being denoted by "H". The dielectric material fills the space between the center conductor and the outer conductors and has a dielectric constant of "$\epsilon_r$".

As can be seen from FIG. 4B, a micro-strip-line transmission line is made up of a top conductor 55, a bottom conductor 60, and a dielectric material 65. The top conductor has a width "W" and a thickness "T". The bottom conductor, or reference plane, is wider than the top conductor and is separated from the top conductor by a distance "H". The dielectric material is positioned between the respective planes of the top conductor and bottom conductor. The dielectric material has a dielectric constant of "$\epsilon_r$"

In practice most micro-strip-lines have a thin layer of material on top of them, which is referred to as a solder mask. Typically, this material will have a dielectric constant value that is similar to the value of "$\epsilon_r$". Once the line is covered with this thin layer of material, it actually becomes an "embedded micro-strip-line." Nevertheless, the example of FIG. 4B does not include a solder mask. Since the line of FIG. 4B includes no solder mask, the line is "embedded in free-space." Accordingly, FIG. 4B includes a symbol "$\epsilon_o$" in the space above the line, the "$\epsilon_o$" symbol indicating the permittivity of free-space.

It should be noted that one or more of the values of "T", "W", "H", and "$\epsilon_r$" may differ from the strip-line of FIG. 4A to the micro-strip-line of FIG. 4B. Thus, for example, the width "W" of center conductor 40 of FIG. 4A may be different from the width "W" of top conductor 55 of FIG. 4B.

It should be further noted that each of the values of "T", "W", "H", and "$\epsilon_r$" may be the same for the strip-line of FIG. 4A and the micro-strip-line of FIG. 4B. In one such embodiment, T=1.4 mil, W=4.0 mil, H=4.0 mil, and $\epsilon_r$=4.0.

Strip-line transmission lines are preferable to micro-strip-lines in many applications because strip-lines can be placed closer together and are narrower than micro-strip-lines of equivalent characteristic impedance. The reduced width of strip-lines relative to micro-strip-lines is due to the close proximity of conductor 45A to the center conductor and the close proximity of conductor 45B to the center conductor. The reduced spacing requirement of strip-lines relative to micro-strip-lines is due to the decrease in coupling or interference (i.e. cross-talk) between neighboring lines. The closer spacing and narrower lines allow space to be conserved, and thereby allow more lines to be run within a given space. Thus, if a particular characteristic impedance is desirable for a segment of transmission line, and such impedance is achievable through use of a strip-line transmission line, it is generally desirable to use a strip-line for the segment. However, the characteristic impedance achievable by strip-line is limited, and thus it may be necessary to use a micro-strip-line in a situation where a strip-line can not achieve the necessary impedance level.

Figure 4C:
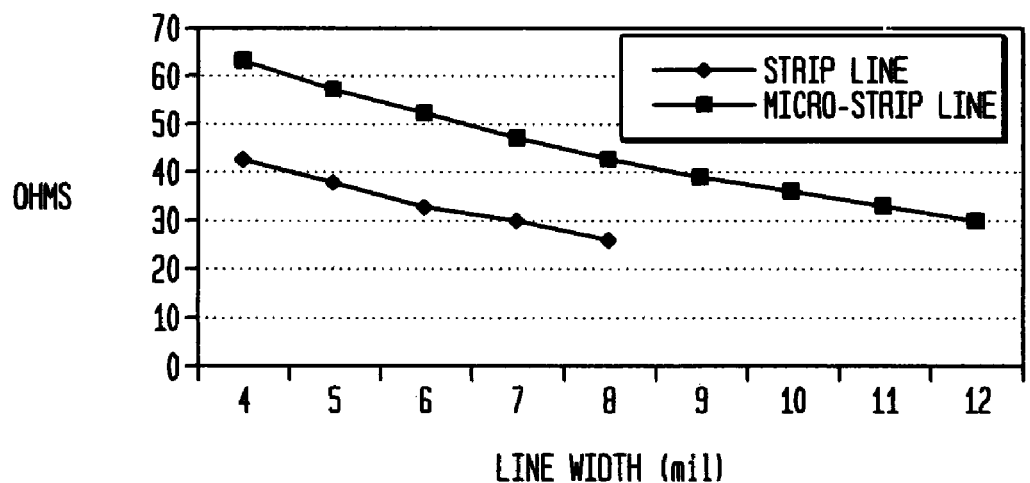
FIG. 4C is a graph depicting the characteristic impedances of typical strip-line and micro-strip-line transmission lines.

FIG. 4C is a graph depicting the characteristic impedances of typical strip-line and micro-strip-line transmission lines. As can be seen from the graph, the maximum characteristic impedance for a strip-line transmission line for the minimum line width is approximately 42 ohms when using the particular configuration depicted in FIG. 4A and a printed circuit board ("PCB") manufacturing process in which the minimum feature size is 4 mils. The maximum characteristic impedance for a micro-strip-line transmission line as configured in FIG. 4B, and made according to a PCB process in which the minimum feature size is 4 mils, is approximately 62 ohms. Notably, the values depicted in FIG. 4C are merely illustrative and the embodiments are not limited by such values.

In view of the desirability impedance-matched multi-drop bus systems, the desirability for minimizing the space occupied by the buses of such systems, and the characteristics of strip-line and micro-strip-line transmission lines, various embodiments of an impedance-matched bus system are now discussed in more detail. For purposes of clarity, it is noted that the term "drop" refers to a load coupled to a transmission line and is alternatively referred to as a "stub." Further, it is noted that the phrase "inter-drop segment" refers to a portion of a transmission line disposed between two drops.

Figure 5:
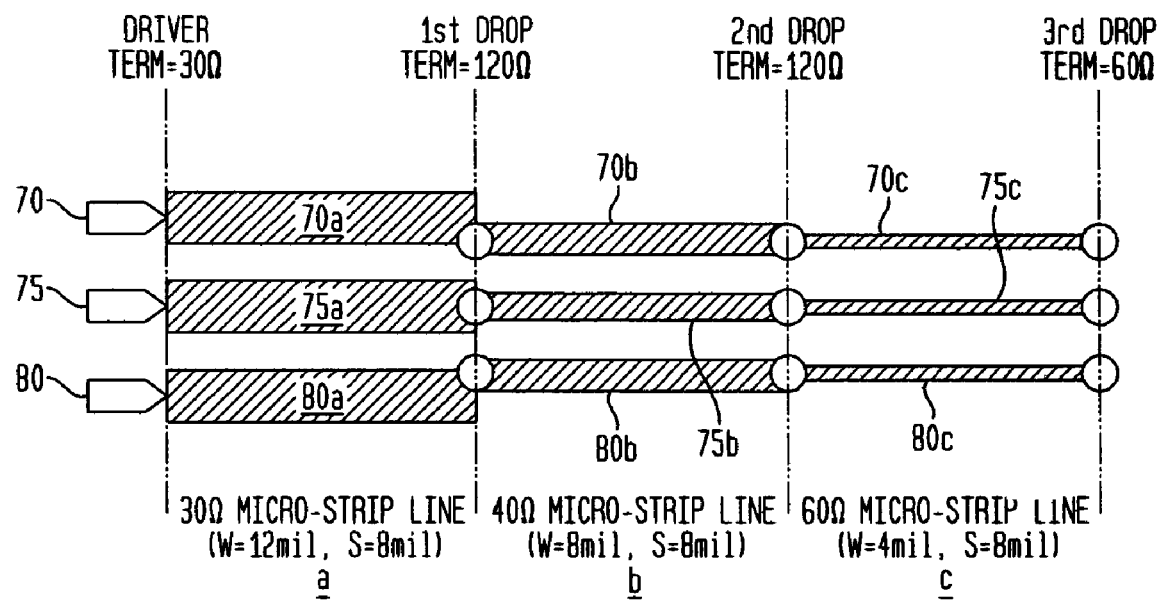
FIG. 5 is a plan view of an impedance-matched three-drop bus system that employs only micro-strip-line transmission lines for the inter-drop segments.

FIG. 5 is a plan view of an impedance-matched three-drop bus system that employs only micro-strip transmission lines for the inter-drop segments. The bus of FIG. 5 includes three bus lines 70, 75, and 80. Each bus line is coupled to three drop points, "1st drop," "$2^{nd}$ drop," and "$3^{rd}$ drop." The drop points divide the bus into three segments "a", "b" and "c" such that each bus line includes three bus line segments. Thus, bus line 70 includes line segments 70a, 70b, and 70c, bus line 75 includes line segments 75a, 75b, and 75c, and bus line 80 includes line segments 80a, 80b, and 80c. A driver drives each of the bus lines. Although the multi-drop bus depicted in FIG. 5 has 3 bus lines, the multi-drop bus of FIG. 5 may have 1 or any number of bus lines. One or more of the micro-strip transmission lines of FIG. 5 may be implemented as a shielded micro-strip transmission line.

In some embodiments, the multi-drop bus of FIG. 5 is an address bus coupling a memory controller to multiple memory modules. In some memory systems which incorporate the multi-drop bus of FIG. 5, the driver (or "source") may be a memory controller like that shown in FIG. 1, and the load at each drop point may be a memory module like those shown in FIG. 1. Each memory module may take the form of one or more memory devices. Thus, some memory systems which incorporate the multi-drop bus of FIG. 5 may include one or more memory modules made up of a single memory device, may include multiple memory modules made up of a single memory device, or may include no memory modules made up of a single memory device.

Referring to FIG. 5, it can be seen that the system in which the multi-drop bus is employed is impedance-matched in the direction of the driver to the drops. That is, for each bus line in FIG. 5, the characteristic impedance of a "feeding" element, either the driver or a line segment, is matched to the equivalent load impedance that the element drives. Thus, the impedance of the "c" segments (60 ohms) matches the impedance of the load at the $3^{rd}$ drop (60 ohms), the impedance of "b" segments (40 ohms) matches the equivalent impedance of the load at the $2^{nd}$ drop (40 ohms; 120 ohms in parallel with 60 ohms), the impedance of the "a" segments (30 ohms) matches the equivalent impedance of the load at the $1^{st}$ drop (30 ohms; 120 ohms in parallel with 40 ohms), and the impedance of the driver, or the "source impedance" (30 ohms) matches the impedance of the "a" segments (30 ohms).

The physical dimensions of the bus of FIG. 5 will be discussed in the context of the bus being laid out on a printed circuit board (PCB). The "length" and "width" dimensions used to describe the bus are said to lie in the plane of the circuit board, with the plane of the circuit board being the plane of the page on which FIG. 5 appears. The "length" dimension is taken to be parallel to the direction running from the driver to the drops, and the "width" dimension is perpendicular to the "length." It is important that in some embodiments the PCB has only one layer in which the micro-strip-lines can reside, and in other embodiments the PCB has only more than one layer in which the micro-strip-lines can reside. Accordingly, in some embodiments all of the micro-strip-lines reside in a single layer, and in other embodiments one or more of the micro-strip-lines reside in one layer while the other micro-strip lines reside in one or more other layers.

As can be seen from FIG. 5, the width of the bus varies from segment to segment. In segment "a" the width of the individual line segments is 12 mil and their spacing is 8 mil, yielding an overall bus segment width of 52 mil. In segment "b" the width of the individual line segments is 8 mil, and their spacing is 8 mil, yielding an overall bus segment width of 40 mil. In segment "c" the width of the individual line segments is 4 mil, and their spacing is 8 mils, yielding an overall bus segment width of 28 mil.

In another embodiment, strip-line segments are used in combination with micro-strip-line segments to reduce the space occupied by the multi-drop bus.

Figure 6:
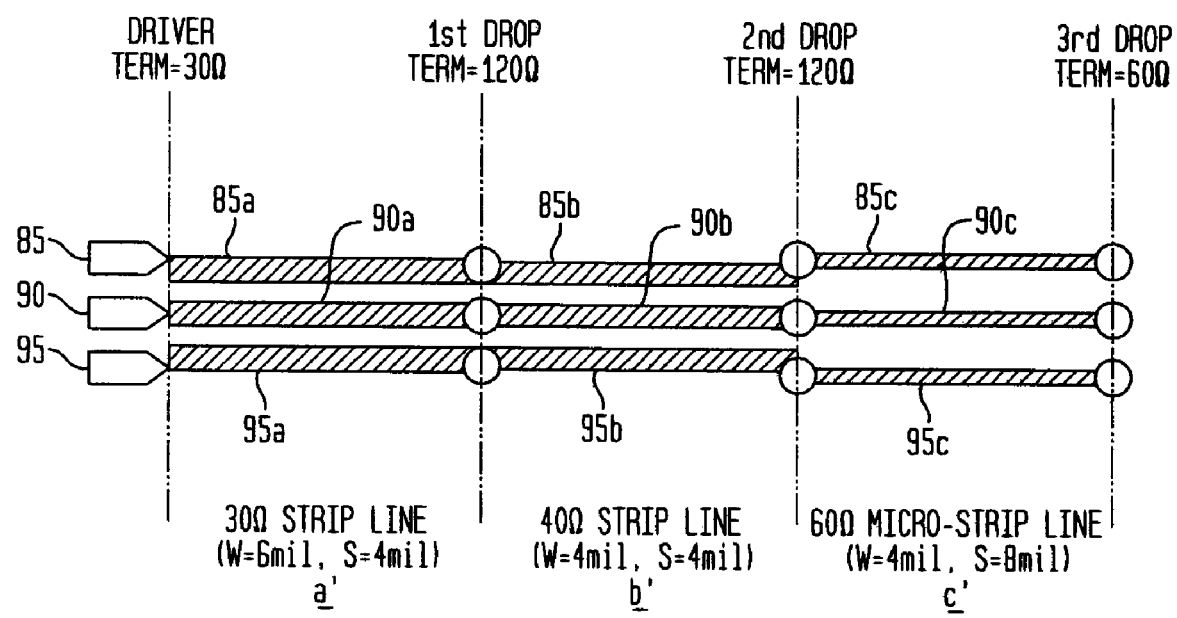
FIG. 6 is a plan view of an impedance-matched three-drop bus system that employs both strip-line and micro-strip-line transmission lines for the inter-drop segments.

FIG. 6 is a plan view of an impedance-matched three-drop bus system that employs both strip-line and micro-strip-line transmission lines for the inter-drop segments. As can be seen by comparing FIG. 6 to FIG. 5, the impedances of the driver, segments and loads are the same in the FIG. 6 and FIG. 5 embodiments. Thus, the impedance matching in the FIG. 6 embodiment is the same as that in the FIG. 5 embodiment. However, in the FIG. 6 embodiment strip-line transmission lines are used for two of the three bus segments.

The bus of FIG. 6 includes three bus lines 85, 90, and 95. Each bus line is coupled to three drop points, "$1^{st}$ drop," "$2^{nd}$ drop," and "$3^{rd}$ drop." The drop points divide the bus into three segments "a'", "b'", and "c'" such that each bus line includes three bus line segments. Thus, bus line 85 includes line segments 85a, 85b, and 85c, bus line 90 includes line segments 90a, 90b, and 90c, and bus line 95 includes line segments 95a, 95b, and 95c. A driver drives each of the bus lines. In some embodiments, the multi-drop bus of FIG. 6 is considered to be an address bus employed in the same application as the address bus of FIG. 5, coupling a memory controller to a multiple of memory modules. Accordingly, the physical dimensions of the bus of FIG. 6 will be described in the same context and using the same conventions as used in the description of the bus of FIG. 5. Still further, for purposes of comparison, all of the segments in FIGS. 5 and 6 will be considered to have the same length.

Referring to FIG. 6, it can be seen that strip-lines are used in bus segments "a'" and "b'". In segment "a'" the width of the individual line segments is 6 mil, and their spacing is 4 mil, yielding an overall bus segment width of 26 mil. In segment "b'" the width of the individual line segments is 4 mil, and their spacing is 4 mil, yielding an overall bus segment width of 20 mil. In segment "c'" the width of the individual line segments is 4 mil, and their spacing is 8 mils, yielding an overall bus segment width of 28 mil. The relatively large width of segment "c'" compared to segments "a'" and "b'" is due in part to the need for greater spacing micro-strip-lines as compared to strip-lines. The additional spacing requirement micro-strip-lines relative to strip-lines is due to the relatively large coupling or interference (i.e. cross-talk) between neighboring micro-strip-lines.

By using strip-lines for bus segments "a'" and "b'", the width of the bus segments is reduced by 50% relative to the width of bus segments "a" and "b" of FIG. 5. Therefore, segments "a'" and "b'" require less circuit board area than segments "a" and "b". Accordingly, the embodiment of FIG. 6 offers all of the advantages of impedance matching with the added advantages of using strip-line transmission lines to conserve area.

It should be noted that strip-lines were not used for segment "c'" because the 60 ohm characteristic impedance necessary for segment "c'" is not achievable using strip-lines given the geometries defined herein (see FIG. 4C).

It should be further noted that in some embodiments the PCB has only one layer in which the strip-lines and/or micro-strip-lines and can reside, and in other embodiments the PCB has only more than one layer in which the strip-lines and/or micro-strip-lines can reside. Accordingly, in some embodiments all of the strip-lines and micro-strip-lines reside in a single layer, and in other embodiments one or more of the strip-lines and micro-strip-lines reside in one layer while the other strip-lines and/or micro-strip lines reside in one or more other layers. In some embodiments, one or more of the micro-strip lines of FIG. 6 are implemented as shielded micro-strip lines.

Having described certain embodiments of an "impedance matched" multi-drop bus system, an illustrative application of such a system will now be described.

One application of an "impedance matched" multi-drop bus system is the use of such a system as a multi-pumped address bus system. The advantages of using an impedance-matched multi-drop bus system as a multi-pumped address bus system include the faster "pumping" of the bus, which increases the rate at which address bits can be sent over the bus and, in turn, decreases the number of bus lines required to send a given number of address bits in a given amount of time. To illustrate, the scenarios illustrated in FIGS. 7A and 7B are considered.

For purposes of clarity, it is noted that the term "pumped" refers the transmission of bits of information in groups such that, for example, a "quad-pumped" address system refers to a system in which an address is partitioned into four groups and the address is sent by respectively transmitting the groups through four separate "pumps" of the system. These "pumps" may occur at separate time intervals, typically in succession.

Figure 7A:
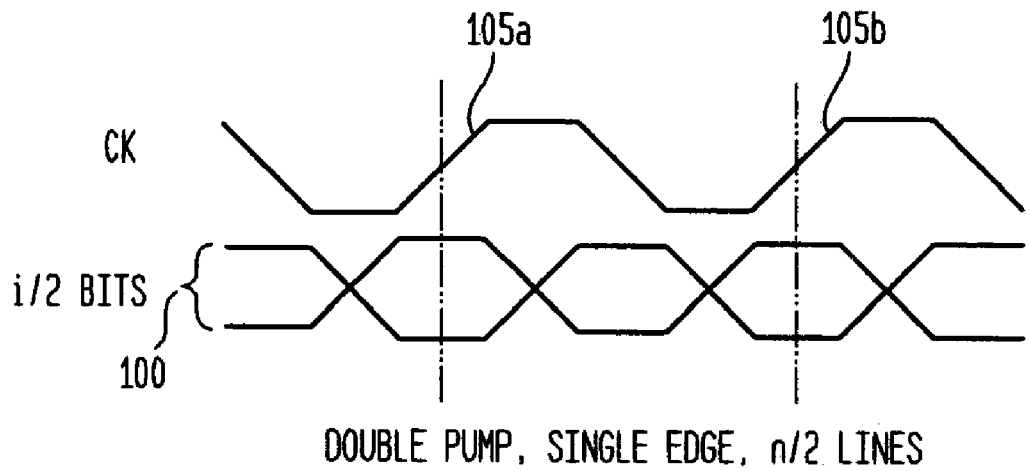
FIG. 7A is a timing diagram showing how "n" address bits are transferred in a double-pumped, single-edge addressing system.

Referring to FIG. 7A, there is shown a timing diagram showing how "i" address bits are transferred in a double-pumped, single-edge addressing system. As can be seen from FIG. 7A, i/2 address bus lines are available and i/2 address bits 100 are transmitted on every rising edge of the clock waveform (e.g. edges 105a and 105b). Accordingly, to send a single i-bit address (using a binary signaling), a minimum of two rising clock edges must occur. The next i-bit address transmission can not begin until a third rising clock edge (not shown) occurs. Therefore, in the FIG. 7A scenario the minimum amount of time between beginning transmission of an i-bit address and beginning transmission of the next i-bit address is two clock periods.

Figure 7B:
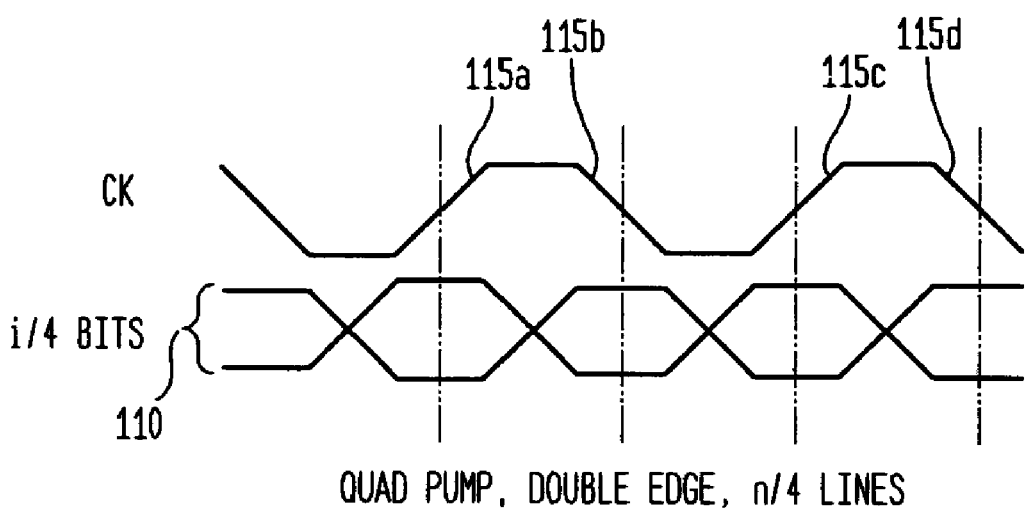
FIG. 7B is a timing diagram showing how "n" address bits are transferred in a quad-pumped, double-edge addressing system.

FIG. 7B is a timing diagram showing how "i" address bits are transferred in a quad-pumped, double-edge addressing system. As can be seen from FIG. 7B, i/4 address bus lines are available and i/4 address bits 110 are transmitted on every rising and falling edge of the clock waveform (e.g. edges 115a, 115b, 115c and 115d). Accordingly, to send a single i-bit address a minimum of four clock edges must occur. The next i-bit address transmission can begin when a fifth edge (not shown) occurs. Therefore, in the FIG. 7B scenario the minimum amount of time between beginning transmission of an i-bit address and beginning transmission of the next i-bit address is two clock periods.

In both the FIGS. 7A and 7B scenarios, the minimum amount of time between beginning transmission of an i-bit address and beginning transmission of the next i-bit address is two clock periods. That is, the rate of addressing is the same. However, the number of address bus lines required in the FIG. 7A scenario is i/2 while the number of address bus lines required in the FIG. 7B scenario is i/4. Thus, by operating the each of the i/4 address bus lines of the FIG. 7B scenario at a faster rate than each of the i/2 address bus lines of the FIG. 7A scenario it is possible to realize the same addressing rate as achieved in the FIG. 7A scenario even though half as many bus lines are used. Thereby, reducing the bus width and attendant circuit board space required to achieve a given rate of i-bit addressing.

By employing an impedance-matched bus system as described in connection with the various embodiments one can operate the bus as described in the FIG. 7B scenario, and thereby realize the advantages of the FIG. 7B scenario.

As these and other variations and combinations of the features discussed above can be utilized without departing from the present invention as defined by the claims, the foregoing description of the one embodiments should be taken by way of illustration rather than by way of limitation of the invention as defined by the claims

What is claimed is:

1. A memory system, comprising:
a memory controller;
first and second memory devices; and
a signal line to couple the memory controller to the first and second memory devices, the signal line comprising:
   a first drop, having an associated first load impedance, to connect to the first memory device;
   a second drop, having an associated second load impedance, to connect to the second memory device;
   a first line segment, having a first characteristic impedance, to couple the controller to the first drop; and
   a second line segment, having a second characteristic impedance, to couple the first drop to the second drop, the second characteristic impedance being matched to the second load impedance.

2. The memory system of claim 1, wherein the first and second load impedances and first and second characteristic impedances provide impedance matching on the signal line for signals transmitted from the memory controller.

3. The memory system of claim 2, wherein the memory controller comprises a driver to transmit signals via the signal line, the driver having an associated impedance matched to the first characteristic impedance.

4. The memory system of claim 3, wherein the first load impedance is 120 ohms, the second load impedance is 60 ohms, the first characteristic impedance is 40 ohms, the second characteristic impedance is 60 ohms, and the impedance associated with the driver is 40 ohms.

5. The memory system of claim 1, wherein the first and second load impedances and first and second characteristic impedances provide imperfect impedance matching at the first drop for signals transmitted from the memory controller to the second memory device and from the second memory device to the memory controller.

6. The memory system of claim 1, further comprising a circuit board, a first memory module, and a second memory module, wherein:
the circuit board comprises the first and second line segments;
the first memory device is situated on the first memory module; and
the second memory device is situated on the second memory module.

7. The memory system of claim 6, wherein:
the first load impedance is an input impedance of the first memory module; and
the second load impedance is an input impedance of the second memory module.

8. The memory system of claim 1, wherein the second line segment comprises a micro-strip-line transmission line.

9. The memory system of claim 7, wherein the first line segment comprises a micro-strip-line transmission line.

10. A memory system, comprising:
a memory controller;
multiple memory devices; and
a multi-drop bus comprising one or more signal lines to couple the memory controller to the multiple memory devices, a respective signal line comprising:
   multiple drops, having associated load impedances, to connect to respective memory devices, the multiple drops comprising a first drop and an end-point drop;
   a first line segment, having a first characteristic impedance, to couple the memory controller to the first drop; and
   one or more additional line segments, having respective characteristic impedances, coupled between respective drops of the multiple drops, the one or more additional line segments comprising an end segment coupled to the end-point drop;
   wherein the characteristic impedance of the end segment is matched to the load impedance associated with the end-point drop.

11. The memory system of claim 10, wherein the load impedances and characteristic impedances provide impedance matching on the respective signal line for signals transmitted from the memory controller.

12. The memory system of claim 11, wherein the memory controller comprises a driver to transmit signals via the respective signal line, the driver having an associated impedance matched to the first characteristic impedance.

13. The memory system of claim 12, wherein:
the one or more additional line segments consist of a second line segment and the end segment;
the multiple drops consist of the first drop, a second drop, and the end-point drop;
the load impedances of the first drop, second drop, and end-point drop are 120 ohms, 120 ohms, and 60 ohms, respectively;
the characteristic impedances of the first line segment, second line segment, and end segment are 30 ohms, 40 ohms, and 60 ohms, respectively; and
the impedance associated with the driver is 30 ohms.

14. The memory system of claim 10, wherein the load impedances and characteristic impedances provide imperfect impedance matching at the first drop for signals transmitted from the memory controller to the end-point drop and from the end-point drop to the memory controller.

15. The memory system of claim 10, further comprising a circuit board and multiple memory modules, wherein:
the circuit board comprises the first line segment and the one or more additional line segments;

respective subsets of the multiple memory devices are situated on respective memory modules of the multiple memory modules; and each of the multiple drops connects to a respective memory module of the multiple memory modules.

16. The memory system of claim 15, wherein the load impedances are input impedances of respective memory modules of the multiple memory modules.

17. The memory system of claim 10, wherein the end segment comprises a micro-strip-line transmission line.

18. The memory system of claim 17, wherein:
the one or more additional line segments further comprise an intermediate segment; and
the first line segment and the intermediate segment each comprise a strip-line transmission line.

19. The memory system of claim 17, wherein:
the one or more additional line segments further comprise an intermediate segment; and
the first line segment and the intermediate segment each comprise a micro-strip-line transmission line.

20. The memory system of claim 10, wherein the one or more signal lines comprise multiple signal lines, each of the multiple signal lines comprising:
multiple drops, having associated load impedances, to connect to respective memory devices, the multiple drops comprising a first drop and an end-point drop;
a first line segment, having a first characteristic impedance, to couple the memory controller to the first drop; and
one or more additional line segments, having respective characteristic impedances, coupled between respective drops of the multiple drops, the one or more additional line segments comprising an end segment coupled to the end-point drop, wherein the characteristic impedance of the end segment is matched to the load impedance associated with the end-point drop.

* * * * *